(12) United States Patent
Darling et al.

(10) Patent No.: US 7,976,992 B2
(45) Date of Patent: Jul. 12, 2011

(54) NON-CIRCULATING COOLANT PEM FUEL CELL POWER PLANT WITH ANTIFREEZE BACK PRESSURE AIR VENTING SYSTEM

(75) Inventors: Robert Darling, South Windsor, CT (US); Tommy Skiba, East Hartford, CT (US)

(73) Assignee: UTC Power Corp., So. Windsor, CT (US)

( * ) Notice: Subject to any disclaimer, the term of this patent is extended or adjusted under 35 U.S.C. 154(b) by 615 days.

(21) Appl. No.: 12/154,639

(22) Filed: May 24, 2008

(65) Prior Publication Data
US 2009/0325001 A1    Dec. 31, 2009

(51) Int. Cl.
*H01M 8/18* (2006.01)
*H01M 8/06* (2006.01)
*H01M 8/04* (2006.01)

(52) U.S. Cl. ........ 429/417; 429/415; 429/437; 429/443; 429/444

(58) Field of Classification Search .................. 429/417, 429/415, 443, 433, 437, 444
See application file for complete search history.

(56) References Cited

U.S. PATENT DOCUMENTS

| | | | |
|---|---|---|---|
| 3,607,665 A | 9/1971 | Rogers | |
| 4,923,767 A | 5/1990 | Grasso et al. | |
| 5,362,577 A | 11/1994 | Pedicini | |
| 6,365,291 B1 | 4/2002 | Margiott | |
| 6,428,916 B1 * | 8/2002 | Grasso et al. | 429/410 |
| 7,282,290 B2 * | 10/2007 | Perry et al. | 429/438 |
| 2003/0064266 A1 | 4/2003 | Ogami et al. | |

* cited by examiner

*Primary Examiner* — Patrick Ryan
*Assistant Examiner* — Julian Mercado
(74) *Attorney, Agent, or Firm* — Andrew Gathy; William W. Jones

(57) ABSTRACT

A PEM fuel cell (4) power plant includes a passive air vent (24) through which air separated from a cathode effluent stream can be expelled from the power plant. The air vent operates satisfactorily during ambient freezing conditions thus it is eminently suitable for use in mobile applications such as in PEM fuel cell-powered automobiles, buses, or the like. The vent is formed from a liquid antifreeze layer (40) that is disposed in a sparging tank (36) which communicates with ambient surroundings. Any water vapor in the stream can condense out of the gas-stream in the antifreeze. In order to facilitate this result, the antifreeze can be a liquid that is immiscible with water so that the condensed water will form a separate layer (38) in the sparging tank.

14 Claims, 1 Drawing Sheet

NON-CIRCULATING COOLANT PEM FUEL CELL POWER PLANT WITH ANTIFREEZE BACK PRESSURE AIR VENTING SYSTEM

This application claims the benefit of PCT/US 05/46913, filed Dec. 23, 2005.

TECHNICAL FIELD

The present invention relates to a polymer electrolyte membrane (PEM) fuel cell power plant which is cooled evaporatively by a non-circulating water (NWM) coolant, an NWM PEM fuel cell system. More particularly, this invention relates to a PEM fuel cell power plant which can operate at freezing temperatures. The system has an air-water separator for separating air from water which are contained in the cathode effluent gas stream. Air from the separator is then vented from the system through an antifreeze column and the water is returned to the coolant section of the system.

BACKGROUND OF THE INVENTION

Polymer electrolyte membrane fuel cell assemblies are relatively low temperature low operating pressure fuel cell assemblies that utilize a catalyzed polymer membrane electrolyte to process air and a hydrogen-rich fuel to produce electricity and water. PEM fuel cells are well suited for use in mobile applications such as automobiles, buses, and the like, because they are relatively compact, light in weight and operate at essentially ambient pressure. This type of fuel cell system can be cooled evaporatively by a non-circulating water coolant. The cooler has an outer plate that is formed with channels which contain the water coolant. The cooler also has an inner porous plate which faces the cathode side of the fuel cell through which an air reactant stream flows. The cell is cooled by water which flows through the porous plate to the air stream and evaporates therein so as to cool the cell. During operation, a small amount of air also diffuses through the porous plate into the water coolant. The cathode reactant stream effluent will comprise a water vapor and air mixture. The water vapor and air components of the cathode effluent mixture are passed through a condenser where water is condensed out of the mixture. The resultant water/air mixture is then passed through a separator station where the condensed water is removed from the mixture and air is vented out of the fuel cell assembly. The water is then returned to the coolant flow field in the fuel cell assembly.

The separator air venting portion of the system typically includes a passage to ambient surroundings which passage permits controlled air flow from the separator by means of mechanical valves and/or fixed nozzles. These valves and/or fixed nozzles in the air bleed passage serve to control back pressure in the liquid/air separator during normal operation. The air stream which is vented from the separator is humid after leaving the condenser. This fact causes operational problems during freezing conditions since the valves and/or nozzles in the air bleed line can freeze up so that air flow can no longer be properly controlled from the system, thus forcing shut down of the system and of the power plant. This problem can be fixed by heating the air bleed line but this solution requires additional heating equipment in the system that increases system complexity and cost.

It would be highly desirable to have a back pressure and flow control system for venting air from the separator which control system can be used in freezing conditions and does not require the use of any complicated mechanical devices during operation of the fuel cell power plant.

DISCLOSURE OF THE INVENTION

This invention relates to an improved system for venting air from an air/water separator component in an NWM PEM fuel cell power plant, and to a method using said system, which power plant is designed primarily for use in mobile applications, such as powering automobiles, buses, and the like. The improved air vent system of this invention can be used in freezing conditions, and does not involve the use of mechanical valves and/or mechanical nozzles for proper operation. The fuel cell power plant is a PEM cell power plant which typically operates at relatively low temperatures and at pressures which are above ambient pressure.

The fuel cell power plant includes a conventional catalyzed polymer membrane electrode having an anode side which receives a hydrogen-rich fuel stream and a cathode side which receives an air reactant stream. A cooling flow field is disposed in heat exchange relationship with the active portion of the fuel cell so as to cool the fuel cell during operation thereof. The coolant used in the system is typically water. The coolant in the cooling flow field does not circulate as a liquid through the fuel cell assembly. The cooling is accomplished by evaporation of the coolant into the reactant flow field. In the fuel cell system of this invention, the air and hydrogen reactant streams are at higher pressures than the coolant water whereby these gases can be ingested into the coolant water through the porous coolant plates in the cells. When this happens, these gases will dissolve in the coolant water. Any air and hydrogen which may be found in the coolant water are bled from the coolant flow field through a porous plug which passes gases there through but will not pass liquids there through. The downstream side of the porous plug will be at a lower pressure than the coolant flow field so as to draw the gases out of the coolant flow field through the plug whereupon the gases can be vented to the atmosphere. A vacuum is needed when the system is operated with low back pressure.

During operation of the power plant, water vapor will vaporize into the air stream from the reaction and from water evaporated in the cooling operation, and will be contained in the cathode side effluent stream that is expelled from the cathode side of the cells in the power plant cell stack. The air-water vapor is circulated through a condenser, and the resultant air/water mixture is then circulated through a separator where the air component is separated from the water component, and the humid air component is vented from the system into ambient surroundings. The water is returned to the coolant flow field from the separator.

The humidified air stream is vented from the fuel cell system to ambient surroundings through a hydrophobic porous body and into and through a passive column of antifreeze which is disposed in proximity with the separator. The air in the vented stream bubbles through the antifreeze into ambient surroundings. Any water in the vented stream also passes through the antifreeze. If so desired, the antifreeze can be one which is immiscible with water whereby the water constituent will rise through the antifreeze and will separate from the antifreeze, and will not dilute the antifreeze. The water layer can then be removed from the antifreeze layer by means of a micro porous membrane. The antifreeze layer will maintain the desired back pressure in the fuel cell system.

The air stream in the system is pressurized for several reasons. First, operating at higher pressures is expected to improve heat rejection from the system in part by raising the temperature of the air/vapor mix leaving the stack. Secondly, the fuel and air pressures must be higher than the coolant water pressure to prevent water from flooding the porous bodies in the unitized electrode assemblies in the power plant.

It will be appreciated that the antifreeze air venting component of the system will function properly at freezing and subfreezing temperatures, and is passive in that it does not require any moving parts in contact with freezing water for proper operation.

BRIEF DESCRIPTION OF THE DRAWINGS

Various objects and advantages of this invention will become more readily apparent to one skilled in the art from the following detailed description of a preferred embodiment of the invention when taken in conjunction with the accompanying drawings in which.

SPECIFIC MODE FOR CARRYING OUT THE INVENTION

Figure 1:
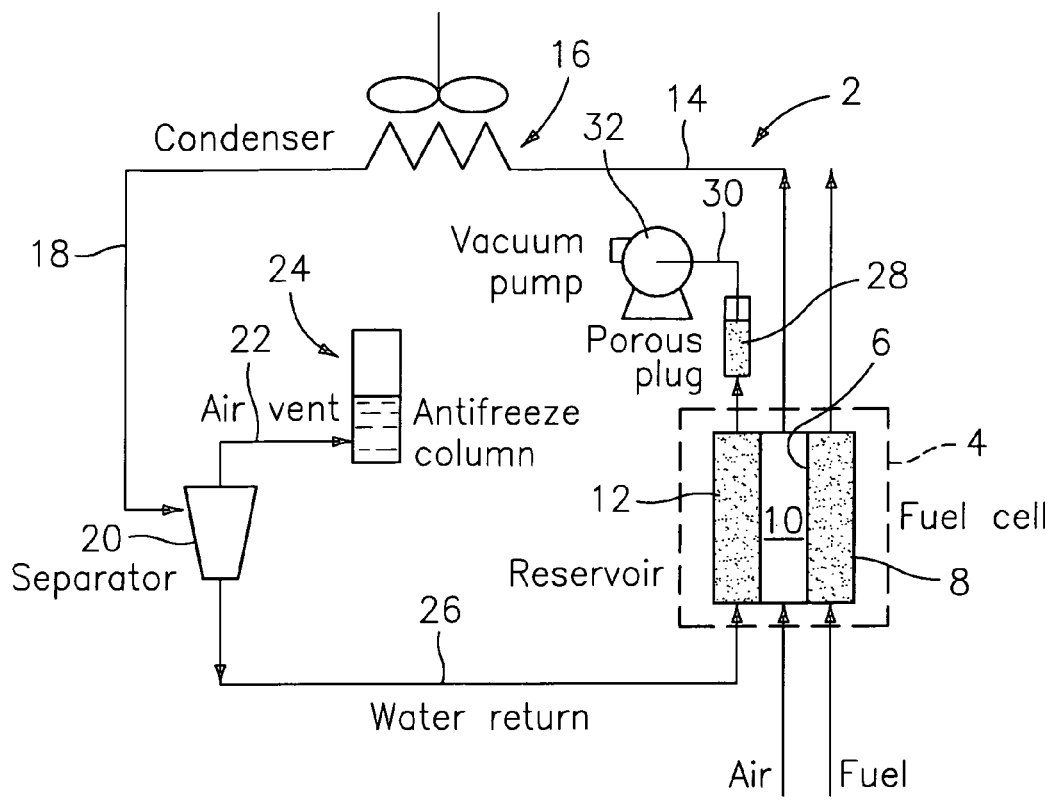
FIG. 1 is a schematic view of a PEM fuel cell assembly which is used in the power plant of this invention.

Referring now to the drawings, FIG. 1 is a schematic view of a PEM cell subassembly part denoted generally by the numeral 2 of a fuel cell power plant formed in accordance with this invention. The fuel cell 4 includes a catalyzed polymer electrolyte membrane 6 which is interposed between a fuel reactant flow field 8 (the anode side) and an oxidant reactant flow field 10 (the cathode side). A coolant flow field 12 is disposed adjacent to the cathode side 10 of the fuel cell 4, however, the coolant flow field 12 could be positioned closer to the anode side 8 of the cell 4. The coolant flow field 12 contains a non-circulating aqueous coolant that serves to cool the PEM cell subassembly 2 so as to maintain the proper operating temperature of the fuel cell 4. During the reaction, the hydrogen in the fuel and the oxygen in the air are converted to electrons and product water. Some of this product water is evaporated from the coolant flow field, in the form of water vapor, into the oxidant flow field 10 of the cell 4 and is removed, along with residual air, as cathode effluent through a line 14 which leads to a condenser 16. The condenser 16 condenses water out of the air/water vapor stream, and the resultant water-air mixture is then taken through a line 18 to a water-air separator 20 where the water fraction of the mixture is separated from the air fraction of the mixture. The air fraction is removed from the separator 20 through a vent line 22 and is vented into ambient surroundings from the line 22 and from assembly 2 through a passive vent structure denoted generally by the numeral 24. The nature of the vent structure 24 will be clarified herein below. The coolant flow field 12 may be kept under a slightly negative pressure, approximately 7 kPa below the air and fuel pressures, by an optional vacuum pump 32 which is connected to the flow field 12 through a line 30 and a hydrophobic porous plug 28 or by pressurizing fuel and air. The vacuum pump 32 will draw any gases, such as air and/or hydrogen, which may be present in the coolant flow field 12 out of the coolant flow field 12 through the porous plug 28. The pores and the height of the plug 28 are sized so as to allow passage of gases through the plug 28 but prevent passage of the coolant liquid there through. Gases siphoned out of the coolant flow field 12 are vented to the ambient surroundings from the pump 32.

Figure 2:
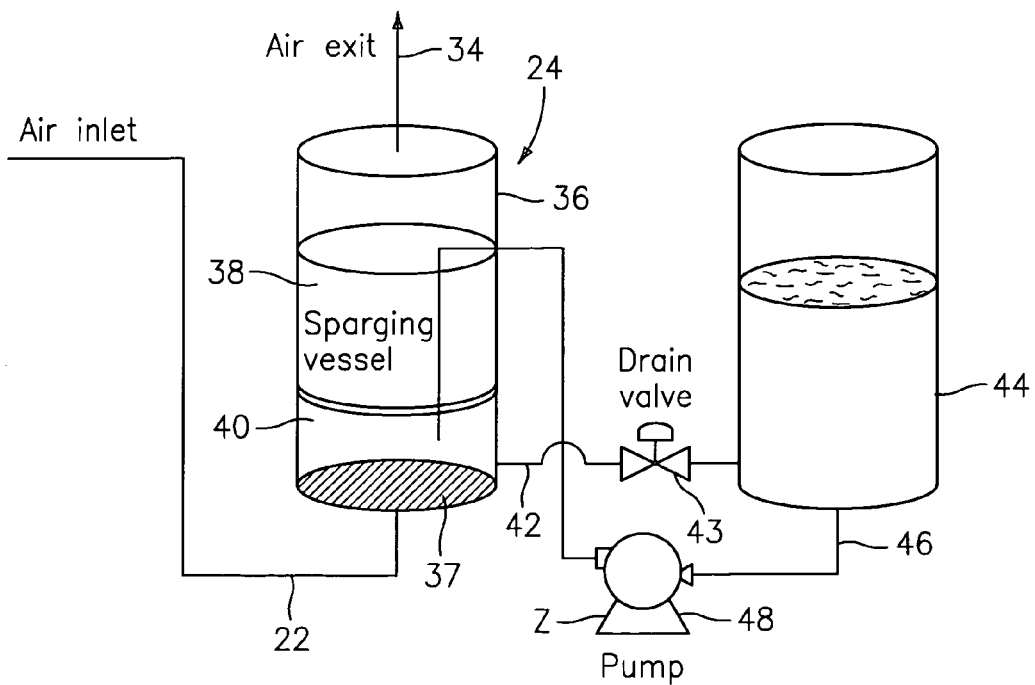
FIG. 2 is a schematic view of the passive air venting portion of the assembly of FIG. 1.

Referring now to FIG. 2, there is shown details of the air vent structure 24. The structure 24 includes a sparging vessel 36 which contains a column of antifreeze 40. The vessel 36 has a porous bottom wall 37 which is formed from a hydrophobic porous material which allows passage of air there through but blocks passage of liquids there through. Thus the air and any water vapor in it to be vented from the system diffuse through the wall 37 into the antifreeze layer 40. The antifreeze 40 can be a material which is immiscible with water, or it can be miscible with water. The former is preferred so as to preserve the ability of the antifreeze to remain liquid under freezing ambient conditions. When the latter is used, the antifreeze layer must be periodically replaced with fresh antifreeze. Immiscible antifreezes can include 3M hydrofluoroether 7400, polydimethylsiloxane, polyphenylmethsiloxane, or the like. Miscible antifreezes can include ethylene glycol, polyethylene glycol, propylene glycol, of the like. As noted, the air stream entering the tank 36 will be humidified so that water may condense out of the air stream in the antifreeze 40. The air in the stream will bubble upwardly through the antifreeze layer 40 and exit the system as indicated by the arrow 34. When the antifreeze layer 40 is water immiscible, any water that condenses out in the antifreeze will layer out in one area 38 of the vessel 36, which is preferably at the top of the vessel 36 and on top of the antifreeze layer 40. The system also includes an auxiliary tank 44 which contains additional antifreeze. Antifreeze located in the area 40 can be periodically removed therefrom through a line 42 which is controlled by a drain valve 43. The back pressure in the system will vary with changes in current density, flow rates and variations in the height of the antifreeze column 40 that the air must bubble through. Thus, when the antifreeze layer level 40 needs to be raised to control the back pressure, the height of the antifreeze layer 40 can be increased by pumping antifreeze out of the tank 44 through a line 46 and a pump 48 and back into the tank 36. Thus the height of the antifreeze layer 40 can be selectively altered in response to system operating conditions.

It will be readily appreciated that the air vent assembly of this invention will operate during ambient freezing conditions, and will not freeze up during operation of the power plant. This fact makes the vent assembly particularly useful in a PEM fuel cell power plant that is designed for use in a mobile device such as a car or the like which often must operate in freezing conditions. The vent assembly of this invention is also a very simple assembly in that it does not require any moving mechanical devices such as valves or nozzles that are exposed to the air stream being vented from the power plant. The air vent assembly will vent air from a humid air stream produced in an air reactant effluent recycling loop to ambient surroundings. The humid air stream is vented through a passive vent structure which includes a column of antifreeze and does not include mechanical valves or nozzles that are prone to freezing. The system of this invention also will alter the height of the column of antifreeze in response to changes in system operating conditions.

Since many changes and variations of the disclosed embodiment of the invention may be made without departing from the inventive concept, it is not intended to limit the invention otherwise than as required by the appended claims.

What is claimed is:

1. In a PEM fuel cell power plant having fuel cells (4) that produce a humidified gaseous reactant effluent stream during power plant operation, a reactant effluent stream processing system comprising:

a) ducts (30) configured to flow the humidified gaseous reactant effluent stream away from said fuel cells;

b) a condenser (16) for condensing water out of the humidified gaseous reactant effluent stream so as to produce a condenser effluent stream which contains gas and condensed water;
c) a separator (20) configured for separating water from gas in the condenser effluent stream; and
d) a vent (24) configured for venting gas from said separator, said vent including a layer of antifreeze (40) through which gas in the separator can pass to ambient surroundings.

2. The processing system of claim 1 wherein said layer of antifreeze has a variable height which is operative to variably control reactant back pressure.

3. The processing system of claim 1 further comprising a water transfer device (26) configured to transfer water from said separator to a water coolant flow field (12) in said fuel cells.

4. The processing system of claim 1 further comprising a reserve supply of antifreeze (44) and a first transfer device (46, 48) configured for selectively transferring antifreeze from said reserve supply thereof to said layer of antifreeze in said vent.

5. The processing system of claim 4 further comprising a second transfer device (42, 43) configured for selectively transferring antifreeze from said layer of antifreeze in said vent to said reserve supply of antifreeze.

6. The processing system of claim 1 wherein at least part of the water in said reactant effluent stream is the result of evaporative cooling of the fuel cells with water which vaporizes from a water coolant flow field into a reactant stream on a cathode side of said fuel cells.

7. The processing system of claim 1 wherein said antifreeze and condensed water are immiscible so that water separates from said antifreeze layer in said vent.

8. The processing system of claim 1 wherein said vent comprises a hydrophobic porous material layer supporting said antifreeze layer, said material layer allowing passage of gases there through but preventing passage of liquids there through, whereby the gas from said separator passes through said material layer into said antifreeze layer.

9. A method for removing air from a humidified reactant effluent stream produced in a PEM fuel cell power plant cell stack, said method comprising:
a) the step of condensing water out of said humidified reactant effluent stream so as to produce an air-water mixture;
b) the step of separating the water constituent from the air constituent in said air-water mixture; and
c) the step of removing said separated air constituent from said separated water constituent by venting said air constituent through a layer of antifreeze and into ambient surroundings.

10. The method of claim 9 comprising the further step of transferring the separated water constituent to a fuel cell stack water coolant supply.

11. The method of claim 9 comprising the further step of selectively removing and/or adding antifreeze from and to said antifreeze layer so as to change a dimension of said antifreeze layer in response to power plant operating conditions.

12. The method of claim 9 wherein said antifreeze is immiscible with water and comprising the further step of condensing any water vapor remaining in said separated air constituent in said antifreeze layer.

13. The method of claim 9 comprising the further step of passing said separated air constituent into said antifreeze layer through a hydrophobic porous plate which supports said antifreeze layer.

14. The method of claim 9 comprising the further step of varying the height of said antifreeze layer so as to selectively vary reactant back pressure.

* * * * *